United States Patent
Peterson et al.

(10) Patent No.: US 10,358,372 B2
(45) Date of Patent: Jul. 23, 2019

(54) APPARATUS AND METHOD FOR FORMING THE OUTER LAYERS OF A GLASS LAMINATE SHEET

(71) Applicant: Corning Incorporated, Corning, NY (US)

(72) Inventors: Irene Mona Peterson, Elmira Heights, NY (US); Olus Naili Boratav, Ithaca, NY (US); Glen Bennett Cook, Elmira, NY (US); Joseph Michael Matusick, Corning, NY (US); David John McEnroe, Corning, NY (US); Srinivasa Rao Vaddiraju, Novi, MI (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/025,651

(22) PCT Filed: Sep. 30, 2014

(86) PCT No.: PCT/US2014/058259
§ 371 (c)(1),
(2) Date: Mar. 29, 2016

(87) PCT Pub. No.: WO2015/048726
PCT Pub. Date: Apr. 2, 2015

(65) Prior Publication Data
US 2016/0229729 A1    Aug. 11, 2016

Related U.S. Application Data

(60) Provisional application No. 61/884,985, filed on Sep. 30, 2013.

(51) Int. Cl.
C03B 7/088    (2006.01)
C03B 17/02    (2006.01)
C03B 17/06    (2006.01)

(52) U.S. Cl.
CPC .............. *C03B 7/088* (2013.01); *C03B 17/02* (2013.01); *C03B 17/064* (2013.01)

(58) Field of Classification Search
CPC ........ C03B 7/088; C03B 17/064; C03B 17/02
See application file for complete search history.

(56) References Cited

U.S. PATENT DOCUMENTS 2,422,466 A    6/1947    Brown
4,106,778 A    8/1978    Cormack et al.
(Continued)

FOREIGN PATENT DOCUMENTS

CN    1715225 A    1/2006
JP    02217327 A    8/1990
(Continued)

OTHER PUBLICATIONS

Ellison et al.; "Glass Substrates for Liquid Crystal Displays"; International Journal of Applied Science 1 [1] (2010); pp. 87-103.
(Continued)

*Primary Examiner* — Queenie S Dehghan
(74) *Attorney, Agent, or Firm* — Gregory V. Bean

(57) ABSTRACT

An apparatus (10) for forming the outer layers of a glass laminate sheet comprises a reservoir (12), individual first (14a) and second (14b) distributors extending below and in fluid communication with the reservoir, and first (30a) and second (30b) slots positioned respectively at the bottom of the first and second distributors. The slots have a length, the distributors have sides and a middle, and the length of the slots on the sides of the distributors is desirably decreased relative to the length of the slots in the middle of the
(Continued)

distributors. The apparatus is useful with a trough or isopipe (100) to provide clad glass streams to contact an overflowing core glass on respective sides of the trough or isopipe.

4 Claims, 6 Drawing Sheets

(56) References Cited

U.S. PATENT DOCUMENTS

| | | | |
|---|---|---|---|
| 4,525,194 A | 6/1985 | Rudoi | |
| 4,731,004 A * | 3/1988 | Wenz, Jr. | B29C 47/0021 425/133.5 |
| 5,401,454 A | 3/1995 | Mendel | |
| 5,834,888 A | 11/1998 | Allen et al. | |
| 8,142,859 B2 | 3/2012 | Domey et al. | |
| 8,211,505 B2 | 7/2012 | Bocko et al. | |
| 2004/0093900 A1 | 5/2004 | Fredholm | |
| 2006/0127679 A1 | 6/2006 | Gulati et al. | |
| 2009/0020909 A1 | 1/2009 | Shirai et al. | |
| 2014/0141217 A1 | 5/2014 | Gulati et al. | |

FOREIGN PATENT DOCUMENTS

| | | |
|---|---|---|
| JP | 2007091503 A | 4/2007 |
| WO | 2013130663 A1 | 9/2013 |

OTHER PUBLICATIONS

W.A. Gifford; "The Effect of Wall Slip on the Performance of Flat Extrusion Dies"; Polymer Engineering and Science, vol. 41, No. 11 (Nov. 2001); pp. 1886-1892.

Kostic et al.; "Design of Extrusion Dies"; Encyclopedia of Chemical Processing (Copyright 2006); pp. 633-649.

Sun et al.; "Optimization of a Flat Die Geometry"; ANTEC (2004); pp. 3307-3311.

European Patent Office; International Search Report and Written Opinion for International Application No. PCT/US2014/058259; dated Dec. 18, 2014; pp. 1-11.

English Translation of JP2016516574 Office Action Dated Jul. 10, 2018, Japan Patent Office, 3 Pgs.

* cited by examiner

APPARATUS AND METHOD FOR FORMING THE OUTER LAYERS OF A GLASS LAMINATE SHEET

CROSS-REFERENCE TO RELATED APPLICATIONS

This application claims the benefit of priority under 35 U.S.C. § 371 of International Patent Application Serial No. PCT/US14/58259, filed on Sep. 30, 2014, which claims the benefit of priority under 35 U.S.C. § 119 of U.S. Provisional Application Ser. No. 61/884,985, filed on Sep. 30, 2013, the contents of which are relied upon and incorporated herein by reference in their entireties.

FIELD

The present disclosure relates to devices and methods for forming laminated glass sheets having a core glass layer surrounded by one or more outer glass layers ("clad" glass layers), and particularly to devices and methods adaptable to a wide range of glass compositions and properties.

BACKGROUND

Laminated glass sheets typically include a core glass layer surrounded by first and second clad glass layers. The composition of the core glass and the clad glass may be selected to have different properties in order to provide desired advantages in the resulting laminate. One significant beneficial property obtainable in the laminate is increased strength and damage resistance: by properly selecting the clad glass and the core glass in connection and the process conditions for forming the laminate (such as by choosing a core glass having a higher CTE than the clad glass), the clad layers in the final laminate sheet will be in compression, resulting in a glass laminate sheet that significantly resists damage and breaking. These and other desirable properties can be obtained from glass laminate sheets.

An isopipe is a convenient apparatus for production of two thin glass sheets and an isopipe may beneficially be used to form the cladding of a glass laminate sheet. However, an isopipe is typically best suited for a rather narrow range of flow rates and viscosities. If flow rates and/or viscosities are changed to accommodate different clad glass compositions to produce sheets optimized for various differing uses, it will typically be the case that the isopipe needs to be tilted to maintain a flat flow profile over the width of the resulting sheet(s). Providing a mechanism for such tilting may be difficult within the constraints of the equipment space available in the manufacturing environment. Furthermore tilting may be only allow for a relatively limited range of different viscosities and flow rates. A new clad forming device and method able to accommodate a wide range of glass viscosities and flow rates within a small equipment footprint would accordingly be useful.

SUMMARY

The present disclosure provides for an apparatus for forming the outer layers of a glass laminate sheet comprising a reservoir, individual first and second distributors extending below and in fluid communication with the reservoir, and first and second slots positioned respectively at the bottom of the first and second distributors. The slots have a length and a width, and the length of the slots is greatest at a center of the width thereof.

The resulting apparatus provides the ability to produce twin glass sheets for the outer layers of a glass laminate by gravity feed over a wide range of viscosities and flow rates, allowing a wide range of glass compositions to be employed.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
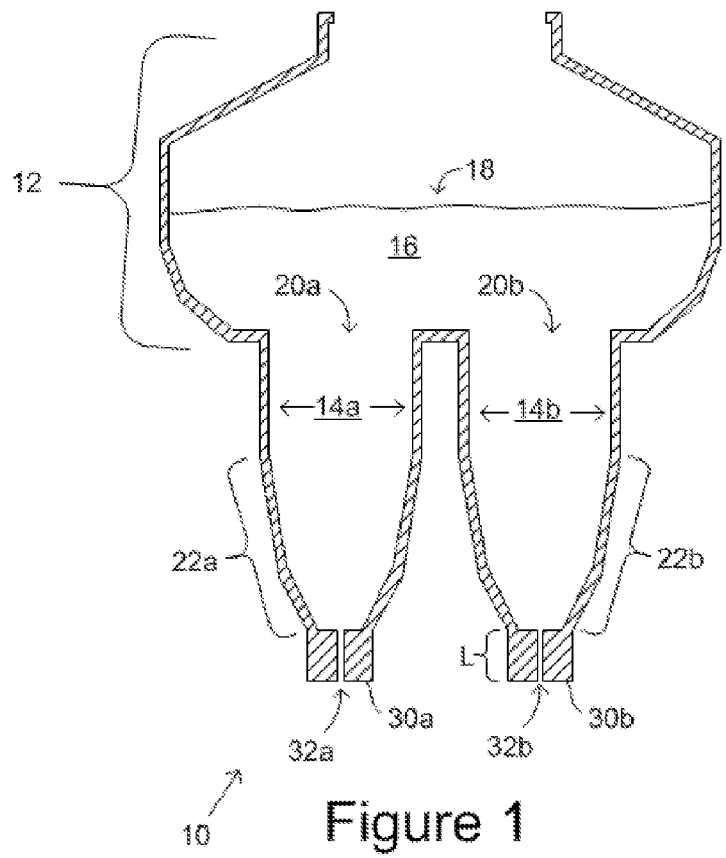
FIG. 1 is a diagrammatic cross-section of an embodiment of an apparatus according to the present disclosure.

Reference will now be made in detail to the present preferred embodiment(s), examples of which is/are illustrated in the accompanying drawings. Whenever possible, the same reference numerals will be used throughout the drawings to refer to the same or like parts.

Figure 2:
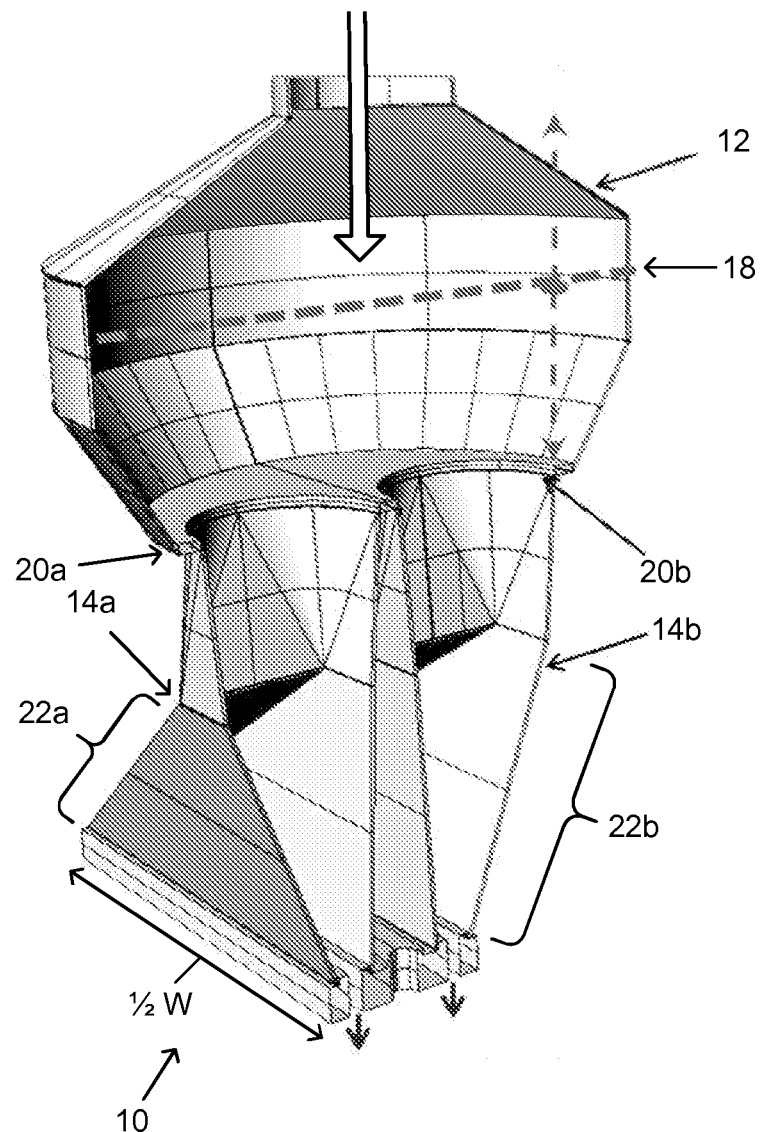
FIG. 2 is a three-dimensional cut-away view of an embodiment similar to that of FIG. 1 of an apparatus according to the present disclosure.

As shown in the diagrammatic cross section of FIG. 1 and in the corresponding three-dimensional cut-away of FIG. 2, the present disclosure provides an apparatus 10 and corresponding method for forming the outer layers of a glass laminate sheet, the apparatus 10 comprising a reservoir 12, below which there are two distributors 14a, 14b, as shown in FIGS. 1 and 2. Glass 16 is fed into the reservoir 12 from the top thereof at a particular flow rate, q. The flow of glass 16 is divided into two by flowing through the entrances 20a, 20b of the two distributors 14a, 14b. The flow in each distributor 14a, 14b then passes through a respective reshaping section 22a, 22b in which the flow is thinned and widened before coming out at the bottom of the apparatus 10 through respective slots 30a, 30b. A three-dimensional representation of the shape of one of the distributors 14a (shown with half of the shape cut away) is given in FIG. 3.

Under operating conditions, the glass 16 fills the distributors 14a, 14b completely, and the free surface 18 of the glass 16 floats at some position within the reservoir 12. The glass 16 upon entering into the reservoir 12 pours onto the free surface 18 to refill the reservoir 12 continuously, and the free surface 18 is desirably maintained consistently at a given level appropriate to the composition of the glass 16 and the needs of the laminate forming process. The free surface level 18 (shown as a dashed line perpendicular to a dashed vertical reference line) in the reservoir 12 may be maintained as needed at any location within the reservoir, depending on the viscosity, flow rate, and density of the glass 16. This allows the use of glasses of widely varying properties and characterstics. The glass flow coming out of each respective exit 32a, 32b, of each respective slot 30a, 30b at the bottom of the respective distributors 14a, 14b, desirably has uniform velocity throughout. The slots have a length L (in the vertical or "flow" direction) (see FIG. 1) and a width W (indicated in FIG. 2 as "½W" since the distributors are shown with one half cut away).

Figure 1A:
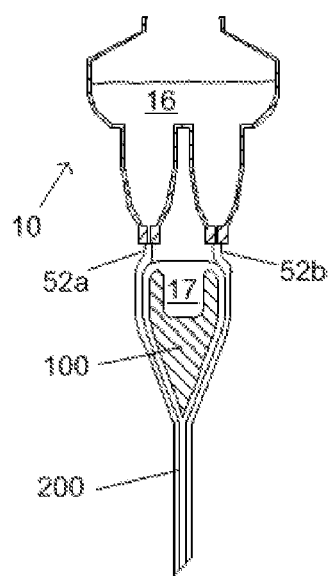
FIG. 1A is a diagrammatic cross section illustrating the use of an embodiment of an apparatus according to the present disclosure to produce a glass laminate.

As shown in FIG. 1A, glass 16 leaving the slots 32a, 32b, according to an embodiment of a process or method of the current disclosure, desirably contacts another different glass 17 as glass 17 is overflowing from a trough or isopipe 100. The spacing of slots 32a, 32b is selected accordingly to match the desire contact points on the trough or isopipe, such that the emerging glass from the slots 32a, 32b is positioned above the glass overflowing from or flowing down along the trough or isopipe 100. Molten clad glass 16 is fed into the apparatus 10 so as to maintain a selected free surface level within the reservoir of the apparatus, and to cause first and second clad glass streams 52a, 52b to emerge from the first and second slots 32a, 32b of the apparatus 10. Molten core glass 17 is supplied to a trough or isopipe 100 sufficiently so as to allow the core glass 17 to overflow the trough or isopipe 100, with the trough or isopipe 100 being positioned below the first and second slots 32a, 32b of the apparatus 10.

The core glass 17 overflowing a first side of the trough or isopipe 100 is contacted with the first clad glass stream 52a while the core glass overflowing a second side of the trough or isopipe 100 is contacted with the second clad glass stream 52b.

The core glass 17 overflowing the first side of the trough or isopipe 100 (now flowing with a layer of clad glass from the first clad glass stream 52a) is then merged with the core glass overflowing the second side of the trough or isopipe 100 (flowing with a layer of clad glass from the second clad glass stream 52b) to form a glass laminate 200 having a core comprising the core glass 17 and a clad comprising the clad glass 16.

Free Surface Level in the Reservoir

A mass and momentum balance equation gives the relation between the pressure drop and the geometry. In its simplest form, where subscript "1" denotes the conditions at the entrances 13a, 13b to the distributors 14a, 14b and subscript "2" denotes the conditions at the exits 32a, 32b of the slots, we can write along a given streamline:

$$\frac{V_1^2}{2} + \frac{P_1}{\rho} + gH - F_{loss} = \frac{V_2^2}{2} + \frac{P_a}{\rho} \quad (1)$$

Here the pressure at the exit of the distributor $P_2$ is taken to be equal to the atmospheric pressure Pa. Rearranging this expression, we have:

$$\frac{P_1 - P_a}{\rho} = -gH + \frac{1}{2}(V_2^2 - V_1^2) + F_{loss} \quad (2)$$

From mass conservation for an incompressible fluid, we can write:

$$V_1 A_1 = V_2 A_2 \quad (3)$$

Combining (2) and (3), we can write:

$$\frac{P_1 - P_a}{\rho} = -gH + \frac{1}{2}V_2^2\left(1 - \left(\frac{A_2}{A_1}\right)^2\right) + F_{loss} \quad (4)$$

Now the condition for the pressure to decrease in the flow/gravity direction, we have to ensure $P_1 > Pa$ that leads to certain design requirements: First, the sum of the second and the third term on the right side of the expression (4) above has to be larger than gH. Second, the second term will have positive contribution only if the area of the distributor at the exit (A2) is smaller than the area at the inlet (A1). This second condition introduces a constraint on the cross-sectional area and thus the thickness of the slots 30a, 30b, which must be small enough such that the second term, when combined with the third term (the loss during the flow from 1 to 2 denoted by $F_{loss}$) (combined with the second term) is to be large enough so that P1>Pa is satisfied.

For the distributor entrance sections 20, which in this embodiment have essentially circular cross section, the Fanning friction factor for laminar flow in round tubes is often taken to be:

$$F_{loss(circ)} = \frac{16\,\mu}{V_{av}\,D\,\rho} \quad (5)$$

However, the resistance of the entrance section, whether circular or oval or other shape is negligible compared to the two main sources of resistance: shape change from distributor entrance to the land sections or slots 30a, 30b, designated R2; and the resistance offered by the slots 30a, 30b, designated R1.

Figure 4:
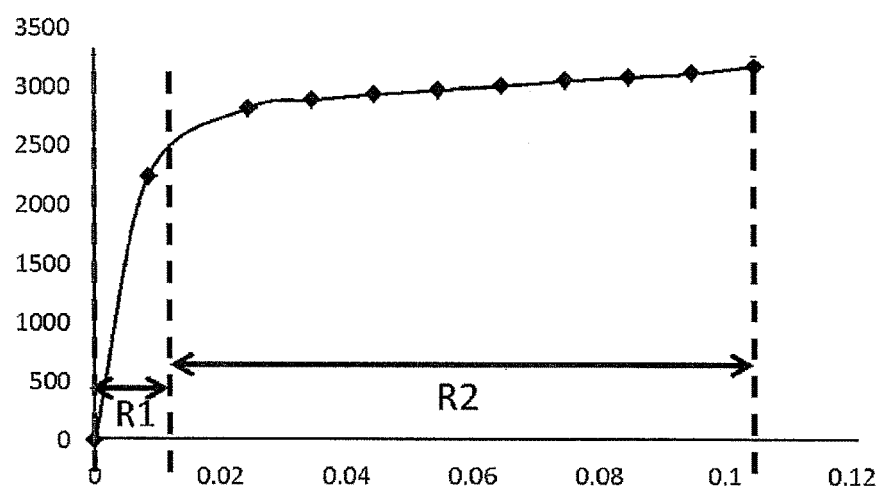
FIG. 4 is a graph of pressure as a function of height above the slot exits of an apparatus like that of FIG. 1 or of FIG. 2.

Computational Fluid Dynamics (CFD) was used to identify the resistance to flow by a given distributor geometry similar to that of FIGS. 1 and 2, without considering gravitational effects, for a typical glass viscosity of 4000 poise and 3.6 kg/h flow rate. Pressure (in Pascal) as a function of height (in meters) above the slot exits is shown in the graph in FIG. 4. As can be seen from the figure, the resistance R1 is considerably higher than the resistance R2, essentially dominating the total resistance or total pressure drop.

The value of R1 (or the pressure drop due to R1) can be obtained analytically from the Poiseuille flow equation for rectangular channels with width>>thickness (as in the case of slots 30a, 30b) as follows:

$$\Delta P = \frac{12\mu L Q}{W h^3} \quad (6)$$

where ΔP is the pressure drop, μ is the viscosity, L is the length of the land, Q is the flow rate, W is the width of the distributor, and h is the thickness.

Figure 5:
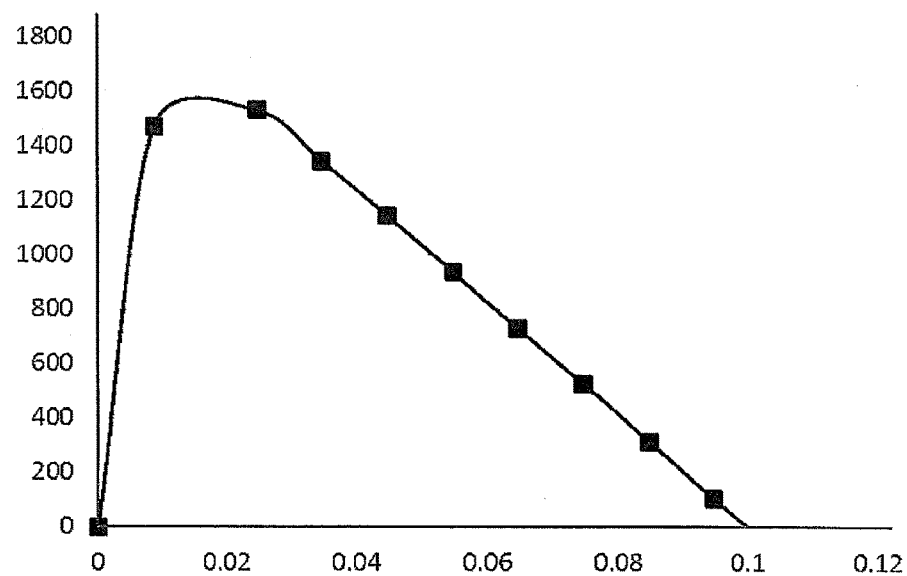
FIG. 5 is a graph of the data of FIG. 4 with the gravitational force acting on the glass is subtracted from the pressure shown in FIG. 4.

When the gravitational force acted on the glass is subtracted from the pressure obtained from model, we get the predicted actual pressure (P—density·g·height), again in Pascal as a function of height position in meters in FIG. 5. For a typical glass viscosity of 4000 poise and 3.6 kg/h with a typical distributor geometry, the free surface is obtained at 0.1 m above the distributor exit, as desired, since in this embodiment the top-to bottom length of the distributors is 0.1 m.

Figure 6:
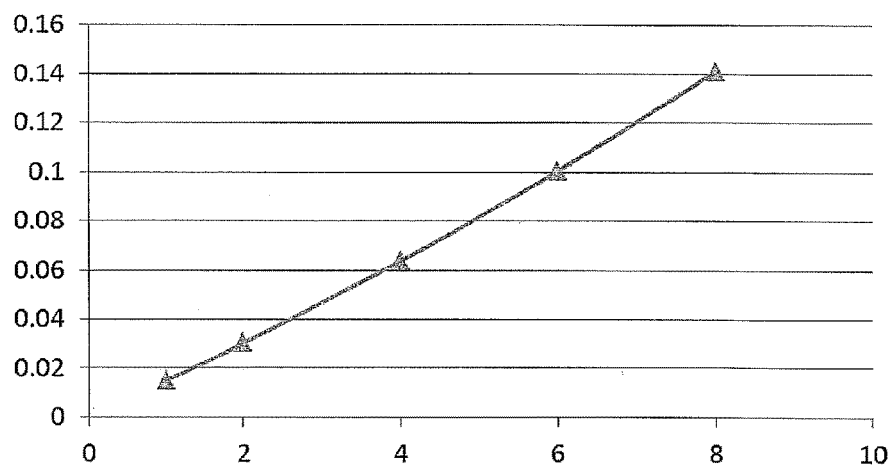
FIG. 6 is a graph of the free surface level above distributor exit as a function of flow rate at a typical glass viscosity of 8000 poise with a representative distributor geometry.
Figure 7:
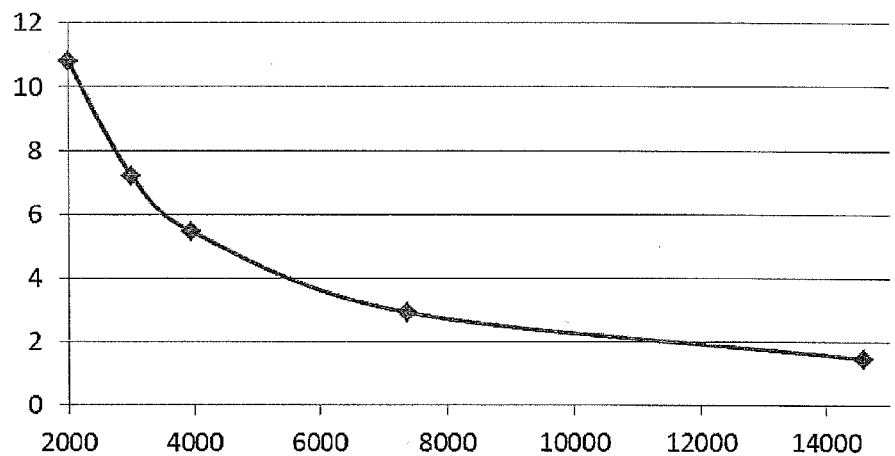
FIG. 7 is the flow rate at which the distributor is just filled completely (at the bottom of reservoir) represented as a function of glass viscosity for a typical glass density of 2,400 kg/m$^3$.

The free surface level above distributor exit in meters is calculated for different flow rates (here given in lbs/h) at a typical glass viscosity of 8000 poise with a typical distributor geometry, as shown in FIG. 6. If the flow rate is 0.9 kg/h (or 2 lbs/h), the free surface level is 0.03 in above distributor exit, and as the flow rate increases the free surface level increases for the gravity driven flow regime. Alternately, the flow rate at which the distributor is just filled completely (bottom of reservoir) may be represented (given here in lbs/h) as a function of glass viscosity for a typical glass density of 2,400 kg/m³ in FIG. 7.

By considering the parameters mentioned above that effect the free surface level, the shape for the distributors can be designed, by changing the slot (land) length, slot thickness, and even by adjusting the properties of the shape change from distributor entrance to the slot, to be capable to deliver glass at a desired range of flow rates, glass viscosities and densities under gravity feed, with a free surface 18 of the glass 16 positioned within the reservoir 12. Desirably, the distributors deliver glass with 8000 poise from 0.3 kg/h to 0.6 kg/h (reservoir almost empty to reservoir full) and for glass with 6000 poise, from 0.4 kg/h to 0.8 kg/hr. In other words, by using embodiments of the apparatus according the present disclosure, a device is provided that is able to deliver glass with 8000 poise at rates in the range of from 0.3·S kg/h to 0.6·S kg/h under gravity feed with a free surface of the glass positioned in the reservoir, and to deliver glass with 6000 poise at rates in the range of from 0.4·S kg/h to 0.8·S kg/hr under gravity feed with a free surface of the glass positioned in the reservoir, where S is an arbitrary scaling constant scaled with the size of the apparatus and with the glass sheets to be produced.

Uniform Glass Flow at Slot Exits

Figure 3:
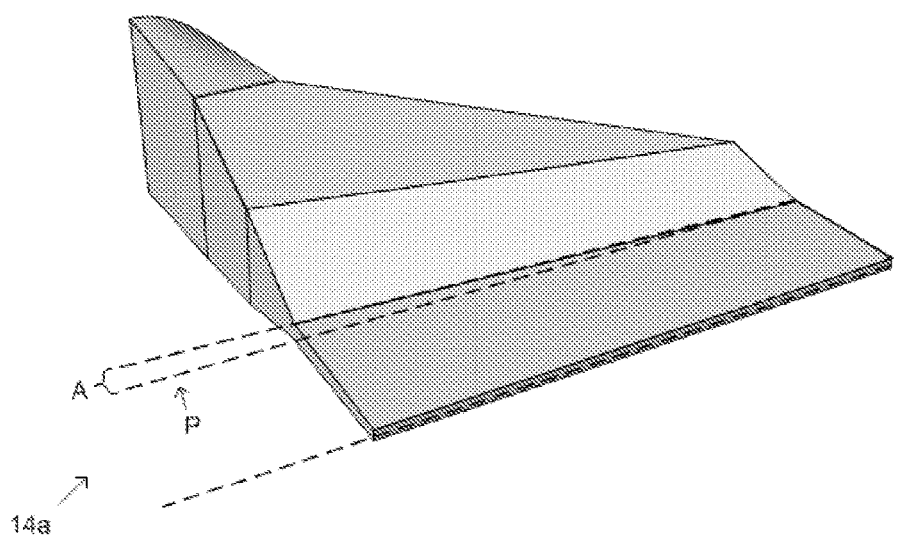
FIG. 3 is a three-dimensional representation of the shape of one of the distributors (shown with half of the shape cut away).
Figure 8:
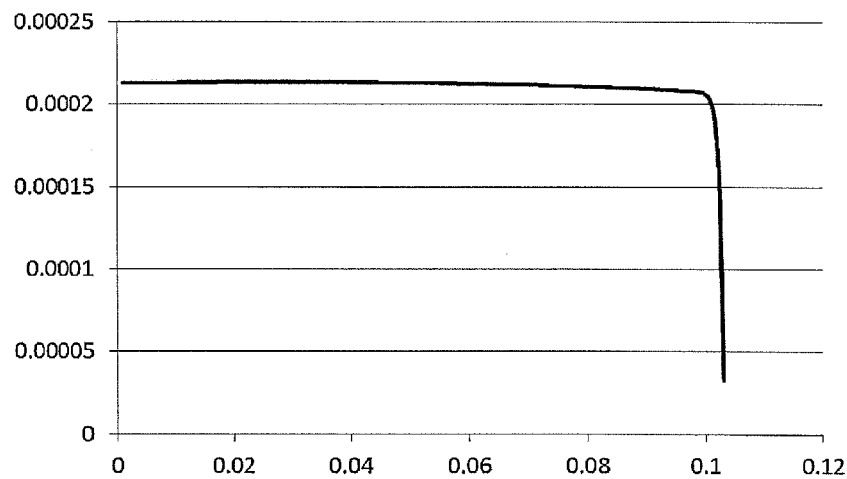
FIG. 8 is a graph of an outflow velocity profile achievable using an embodiment of the apparatus of the present disclosure with distributors as disclosed.
Figure 9:
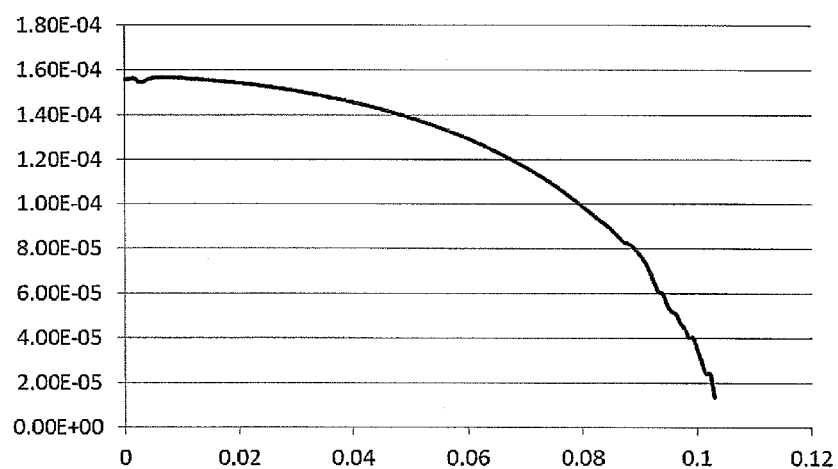
FIG. 9 is a comparative graph of a calculated outflow velocity profile for an apparatus similar to that disclosed herein but having distributors with constant length slots.

It is desirable to have uniform glass flow at the slot exits. Generally, for a given fluid at a given flow rate, the flow resistance is dependent on the length and cross-sectional area of the flow path. A longer flow path leads to higher flow resistance than a short one. Meanwhile, for the given fluid at a given flow rate, a flow path with a greater cross-sectional area results in lower shear strain rate and leads to lower flow resistance. Thus, if the length (which here is the vertical length) is greatest at a center of the width of the slots, or in other words, at the middle of the distributor, the flow resistance difference between flow path to the center of the slot and the flow path to the sides of the slot can be largely eliminated, so that glass is more uniformly distributed from the middle toward the sides. Accordingly, the distributor according to present disclosure desirably has slots with a length and a width, wherein the length of the slots is greatest at a center of the width. According to one alternative, this may be achieved by introducing an angle "A" to the top of the slot, as shown in FIG. 3, which makes the flow resistance balanced throughout distributor, delivering a more uniform flow out of the slot. Also, an overall increase in the slot length will help for better uniformity of the flow profile at the exit. Plotted in FIG. 8 is the outflow velocity profile achievable using this embodiment of distributor. A comparative outflow velocity profile for a distributor with constant length slot is plotted in FIG. 9 as an example predicted by CFD modeling, showing the relatively high non-uniformity of flow that results.

It will be apparent to those skilled in the art that other various modifications and variations can be made without departing from the spirit or scope of the claims.

What is claimed is:

1. An apparatus for forming the outer layers of a glass laminate sheet, the apparatus comprising:
   a reservoir;
   individual first and second distributors extending below and in fluid communication with the reservoir; and
   first and second slots positioned respectively at the bottom of the first and second distributors, each distributor comprising a respective entrance at the reservoir and a respective reshaping section extending downward from the reservoir to the respective slot, wherein the slots have a bottom and a top, wherein each-respective entrance at the reservoir has a respective entrance cross sectional area and wherein each respective slot has a respective slot cross sectional area, and wherein each respective slot cross sectional area is less than a corresponding respective entrance cross sectional area, and wherein the distributors are capable to deliver glass with 8000 poise at rates between and including a positive minimum 8000 poise rate and a positive maximum 8000 poise rate, under gravity feed with a free surface of the glass positioned in the reservoir, the positive maximum 8000 poise rate and the positive minimum 8000 poise rate having a ratio of 2:1, and to deliver glass with 6000 poise at rates between and including a positive minimum 6000 poise rate and a positive maximum 6000 poise rate, under gravity feed with a free surface of the glass positioned in the reservoir, the positive maximum 6000 poise rate and the positive minimum 6000 poise rate having a ratio of 2:1 and the the positive maximum 6000 poise rate and the positive maximum 8000 poise having a ratio of 4:3.

2. The apparatus according to claim 1 wherein the second distributor is a mirror image of the first.

3. The apparatus according to claim 1 wherein the slots have a length and a width, and wherein the length of the slots is greatest at a center of the width.

4. The apparatus according to claim 1 wherein the slots have a bottom and a top and wherein the top of the slots is sloped at an angle relative to the bottom of the slots such that the length of the slots on the sides of the distributors is decreased relative to the length of the slots in the middle of the distributors.

* * * * *

UNITED STATES PATENT AND TRADEMARK OFFICE
CERTIFICATE OF CORRECTION

PATENT NO. : 10,358,372 B2
APPLICATION NO. : 15/025651
DATED : July 23, 2019
INVENTOR(S) : Irene Mona Peterson et al.

It is certified that error appears in the above-identified patent and that said Letters Patent is hereby corrected as shown below:

In the Claims

In Column 6, Lines 52, Claim 1, before "positive" delete "the".

Signed and Sealed this
Seventeenth Day of December, 2019

Andrei Iancu
*Director of the United States Patent and Trademark Office*